United States Patent [19]
Harada et al.

[11] Patent Number: 5,929,427
[45] Date of Patent: Jul. 27, 1999

[54] PORTABLE CARD READER/WRITER

[75] Inventors: Kaoru Harada, Iabraki-ken; Yuhei Abe, Hitachinaka; Atsuhiko Urushihara; Masayuki Ohki, both of Kokubunji, all of Japan

[73] Assignee: Hitachi, Ltd., Japan

[21] Appl. No.: 08/804,686

[22] Filed: Feb. 25, 1997

[30] Foreign Application Priority Data

Feb. 28, 1996 [JP] Japan .................................. 8-041136

[51] Int. Cl.⁶ .................................................. G06K 19/06
[52] U.S. Cl. ............................................ 235/492; 235/486
[58] Field of Search ................................ 235/486, 485, 235/492

[56] References Cited

U.S. PATENT DOCUMENTS

| | | | |
|---|---|---|---|
| 4,277,837 | 7/1981 | Stuckert | 235/379 |
| 4,709,136 | 11/1987 | Watanabe | 235/379 |
| 4,802,218 | 1/1989 | Wright et al. | 235/375 |
| 5,272,319 | 12/1993 | Ray | 235/379 |
| 5,434,395 | 7/1995 | Storck et al. | 235/379 |
| 5,667,397 | 9/1997 | Broschard, III et al. | 439/188 |
| 5,686,714 | 11/1997 | Abe et al. | 235/435 |

FOREIGN PATENT DOCUMENTS 1-144957   10/1989   Japan .

*Primary Examiner*—Donald Hajec
*Assistant Examiner*—Diane I. Lee
*Attorney, Agent, or Firm*—Evenson, McKeown, Edwards & Lenahan, P.L.L.C.

[57] ABSTRACT

A body of a portable card reader/writer has open slots and includes key switches and a display located thereon. The IC card can be inserted either slot of the body. The end of the IC card inserted from one slot is positioned by a positioning member in the vicinity of the other slot. In this position, contacts of a connector of the IC card are electrically connected to contacts of an IC connector of the body. In addition, the body is provided with a positioning member which positions the IC card inserted from the other slot, and an IC connector.

3 Claims, 6 Drawing Sheets

PORTABLE CARD READER/WRITER

BACKGROUND OF THE INVENTION

1. Technical Field

This invention is related to an apparatus into which an IC card or the like is inserted to read and/or write information from and/or to the IC card.

2. Description of Related Art

Japanese Utility Model Application laid open No. 1-144957 teaches an IC card reader/writer which can be termed background art relative to the present invention. This apparatus includes a slot located at one side of a body thereof into which an IC card is inserted, and a door swingably mounted by a pin at an upper side of the slot. This IC card reader/writer is designed to prevent dust from entering, but is void of any feature to facilitate use depending on whether the user is right-handed or left-handed.

Generally, devices other than symmetric ones are more or less easy to use depending on the handedness of the user. Conventionally, such devices have ordinarily been arranged to be easier to use by a right-handed person than by a left-handed person, because there are more right-handed persons than left-handed persons. Therefore, the left-handed users must often endure inconvenience.

SUMMARY OF THE INVENTION

The object of the present invention is to provide a card reader/writer which is easy to use not only by right-handed persons but also by left-handed persons.

The above and other objects of the present invention are accomplished by an IC card reader/writer for reading a signal from an IC card and/or for writing a signal to the IC card comprising a hollow body having openings, a positioning member which positions the IC card in one place when the IC card is inserted from a first slot located on one side of the body, and positions the IC card in the other place when the IC card is inserted from a second slot located on the other side of the body, a first IC connector electrically connected to a connector on the IC card inserted through the first slot and positioned in the one place, and a second IC connector electrically connected to the connector on the IC card inserted through the second slot and positioned in the other place.

According to the present invention, the card positioning member positions the IC card in the one place when the IC card is inserted from the first slot and positions the IC card in the other place when the IC card inserted from the second slot, and the connectors of IC cards are electrically connected to the respective first and second IC connectors. Accordingly it is possible to insert the IC card from either one or the other side.

In a preferred aspect of the present invention, the positioning member includes a first gate device located in the vicinity of the first slot and a second gate device located in the vicinity of the second slot, the first gate device is adapted to enable the IC card inserted from the first slot to advance and inhibit the IC card inserted from the second slot from advancing, and the second gate device is adapted to enable the IC card inserted from the second slot to advance and inhibit the IC card inserted from the first slot from advancing.

Preferably, each of the gate devices includes a rotation member which rotates around one end of the opening and is restricted in rotation to be prevented from protruding outward from the opening, and an urging member which urges the rotation member to obstruct the opening. When the IC card to be enabled to advance comes into contact with the rotation member, the rotation member rotates against the urging member, thereby enabling the IC card to advance, and when the IC card to be inhibited from advancing is inserted from one slot, the rotation member continues to obstruct the other slot by the action of the urging member, thereby inhibiting the IC card from advancing.

In another preferred aspect of the present invention, the IC card reader/writer further comprises two guide walls each extending from the first slot to the second slot and bowed toward each other. The one guide wall includes a first inclined surface guiding the IC card inserted from the first slot and a second inclined surface, being continuous on the first inclined surface and guiding the IC card inserted from the second slot. The other guide wall includes a third inclined surface facing the first inclined surface and a forth inclined surface, being continuous on the third inclined surface and facing the second inclined surface. The positioning member includes a first stopper located at an end of the third inclined surface of the other guide wall adjacent to one opening and slightly protruded toward the one guide wall, the first stopper inhibiting the IC card inserted from the second slot from advancing, and a second stopper located an end of the forth inclined surface of the other guide wall adjacent to the other opening and slightly protruded toward the one guide wall, the second stopper inhibiting the IC card inserted from the first slot from advancing.

According to this aspect, it is possible to accomplish an IC card reader/writer into which the IC card can be inserted from the one or the other side without movable components.

Preferably, the third inclined surface guides the IC card inserted from the second slot and the forth inclined surface guides the IC card inserted from the first slot.

In another preferred aspect of the present invention, the positioning member includes a slider slidable between the first and second slots in a direction of IC card insertion. The insertion of the IC card from the first or second slot causes the slider to slide to and stop at a predetermined end position where it inhibits the IC card from advancing, thereby positioning the IC card.

In a further preferred aspect of the present invention, an IC card reader/writer further comprises at least one guide wall extending from the first slot to the second slot in the direction of IC card insertion. The slider includes a groove matched to and slidable along the guide wall and the ends of the guide wall limit the slidable movement of the slider.

DESCRIPTION OF THE PREFERRED EMBODIMENTS

Figure 1:
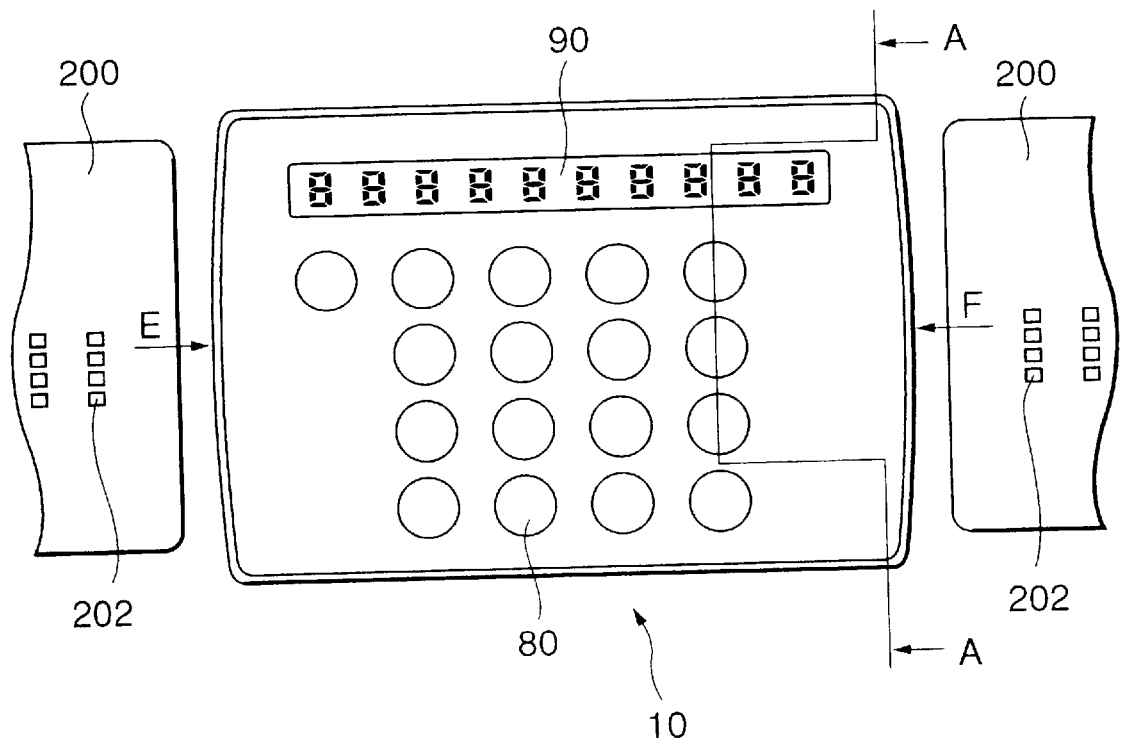
FIG. 1 is a schematic plan view of a card reader/writer according to a first embodiment of the present invention.
Figure 2:
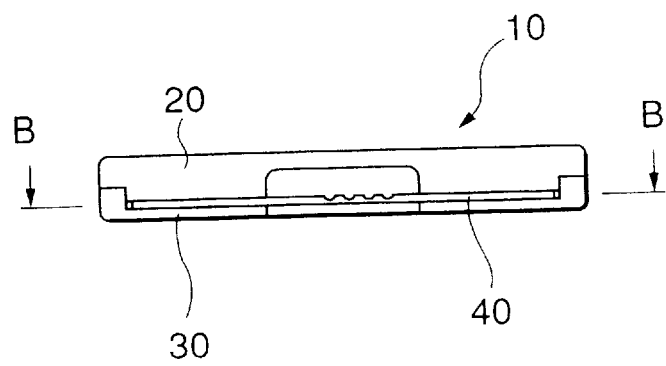
FIG. 2 is a schematic side view of the card reader/writer according to the first embodiment.
Figure 3:
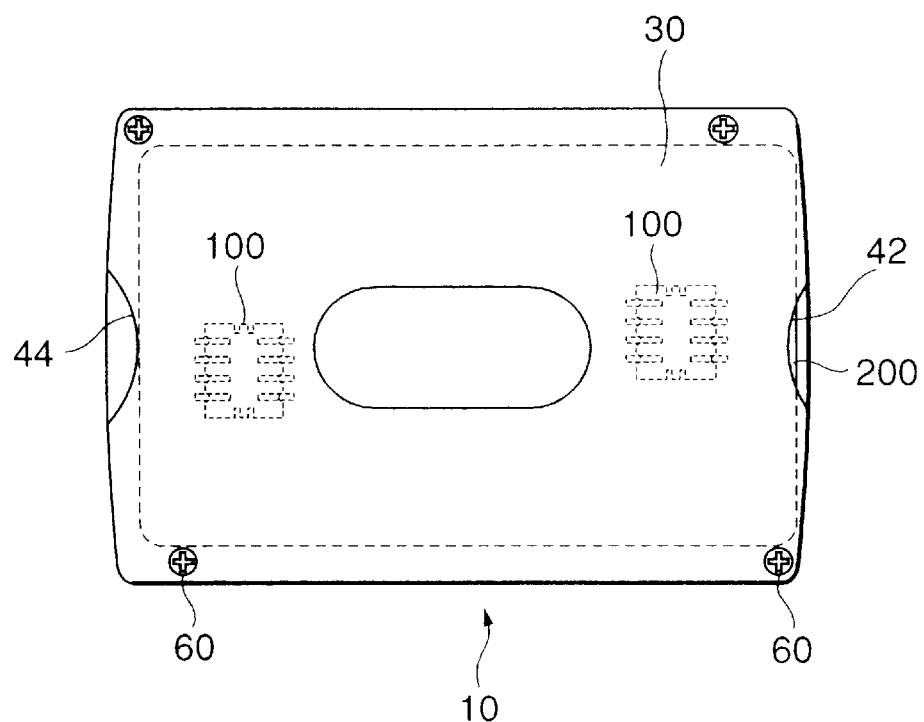
FIG. 3 is a schematic bottom view of the card reader/writer according to the first embodiment.

As shown in FIGS. 1 and 2, a body 10 of an IC card reader/writer according to a first embodiment of the invention is constituted of an upper member 20 and a lower member 30. These members 20, 30 are formed of a resin such as plastic. A card holder-like shape is obtained by placing the upper member 20 on the lower member 30. Each of the upper member 20 and lower member 30 is formed into a shallow U-shape, and the side walls of one member align flush with those of the other member when the members are placed on each other. The upper member 20 and lower member 30 are assembled by placing one on the other and screwing screws into screw holes provided therein, whereby the members can be fixed each other. The longitudinal ends of each of the upper member 20 and lower member 30 are opened to form two open card slots 40, 40 when the members are overlaid. The width of the card slots 40, 40 is slightly larger than that of an IC card 200. Accordingly, the IC card reader/writer enables the IC card 200 to be inserted from either left or right side.

The upper surface of the upper member 20 is provided with a plurality of switch keys 80 and a display 90 for displaying information.

Figure 7:
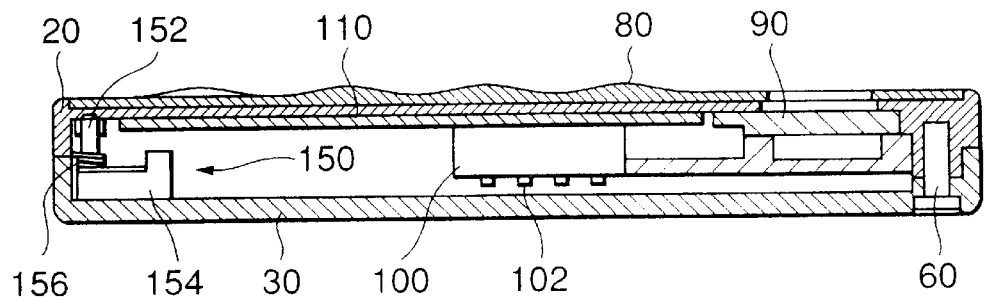
FIG. 7 is a schematic sectional view taken along line A—A of FIG. 1.

As shown in FIG. 7, the back surface of the upper member 20 is provided with IC connectors 100, 100 for reading or writing information from or to the IC card, and a circuit board 110 for processing the read-out signal.

The circuit board 110 is sandwiched between the upper member 20 and the lower member 30 and fixed in place within the body 10. Alternatively, the circuit board 110 is mounted on the upper member 20 or the lower member 30 by screws or the like. On the circuit board 110 are located two IC connectors 100, 100, integrated circuits (ICs), e.g. a liquid crystal display (LCD) driver (not shown), and circuit components necessary for reading or writing signals from or to the IC card. Each of the IC connectors 100, 100 includes a plurality of contacts 102. As described later with reference to FIG. 6 and other drawings, when the IC card 200 has been inserted within the body and is located in place, these contacts 102 are electrically connected to contacts 202 of a connector located on the IC card 200.

Figure 4:
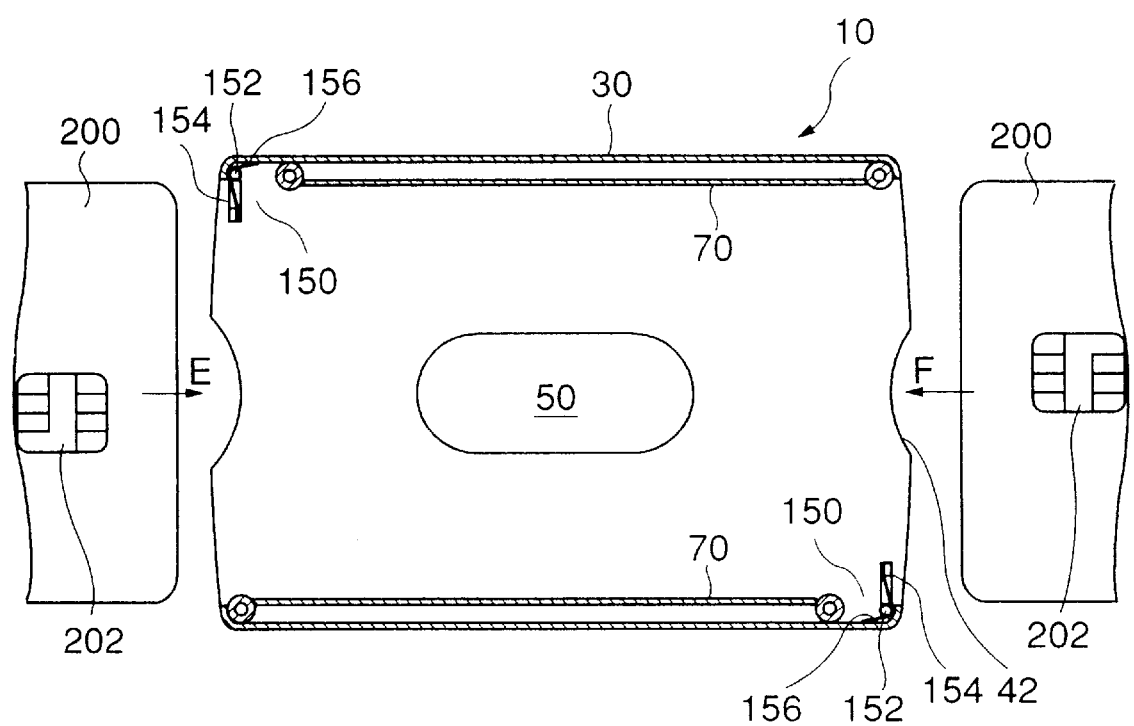
FIG. 4 is a schematic sectional view taken along line B—B of FIG. 2.

In addition, as shown in FIG. 4, a central portion of the lower member 30 is provided with a substantially rectangular opening 50. This opening 50 is for enabling the user to determine whether the IC card is inserted or not, and for putting the IC card in and taking it out.

Figure 6:
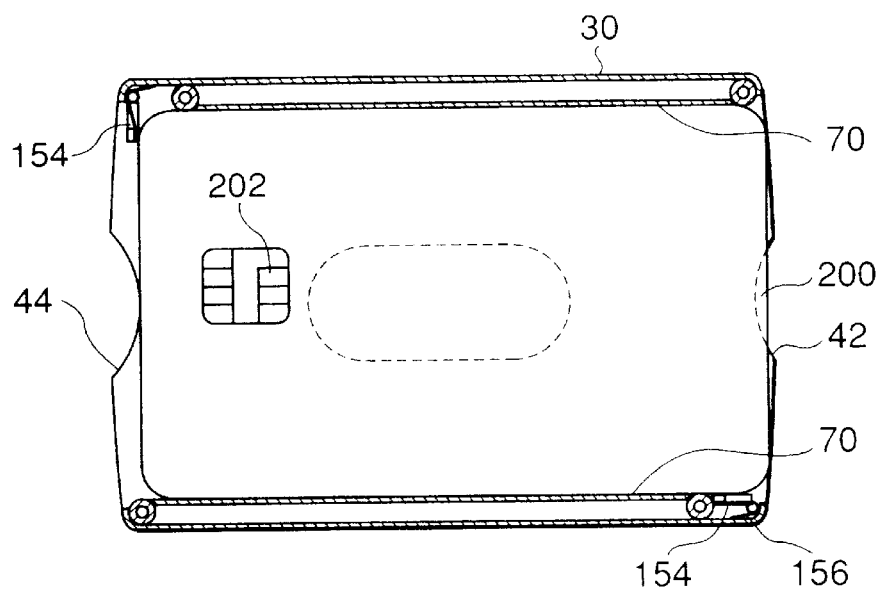
FIG. 6 is a schematic sectional view, which shows an IC card inserted into the card reader/writer of FIG. 1.

The inside of the IC card reader/writer of the first embodiment will now be explained in more detail. As shown in FIGS. 4 and 6, the inside of the body 10 is provided with two guide walls 70, 70 along and parallel to longitudinal inner walls of the lower member 30. These guide walls 70, 70 unite with the lower member 30, and are parallel to each other. When the IC card 200 is inserted from either slot 40, it is guided into the body 10 by these guide walls 70, 70.

Figure 5:
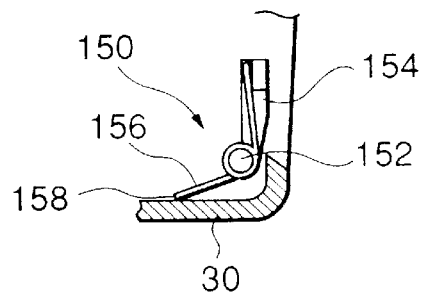
FIG. 5 is a partial enlarged view of FIG. 4, which shows a gate member.

In addition, gate devices 150, 150 for allowing the IC card to pass or for restricting the movement thereof are located at the longitudinal ends of the lower member 30, in the vicinity of card insert openings 42, 44 constituting the slots 40, 40. FIG. 5 shows the gate device 150 more specifically. As shown in FIG. 5, the gate device 150 includes a gate member 154 rotatably mounted on a pivot 152, and a spring 156 fixed to the gate member 154 at one end thereof and urging the gate member 154 toward the slot 40. In other words, the gate member 154 is normally urged to obstruct the slot 40 by the spring 156. The rotation of the gate member 154 is restricted to prevent its protrusion from the slot 40. Namely, in FIG. 5, even if a force from the inside to the outside of the body 10 is applied to the gate member 154, the gate member 154 does not move outward.

In the thus constructed IC card reader/writer, when the IC card 200 is inserted from the card insert opening 42 in the direction of an arrow F as shown in FIGS. 1 and 4, an end of the IC card 200 comes into contact with the gate member 154 of the gate device 150 located in the vicinity of the card insert opening 42. As the IC card 200 is inserted, the gate member 154 rotates toward the inside of the body 10 against the spring 156 to allow the IC card 200 to pass.

Then, when the IC card has reached the vicinity of another card insert opening 44, the end of the IC card 200 comes into contact with the other gate member 154 of the gate device 150 located in the vicinity of the card insert opening 44. As mentioned above, even if the force from the inside to the outside of the body 10 is applied to the gate member 154, the gate member 154 does not move outward, whereby the IC card 200 is inhibited from advancing in the direction of the arrow F so as to be positioned in place. In the position shown in FIG. 6, the contacts 102 of the IC connector 100 are electrically connected to the contacts 202 of the connector located on the IC card 200. The user operates the switch keys 80, which causes a signal to be read from the IC card to the IC card reader/writer and predetermined information to be displayed on a screen of the display 90, or causes a predetermined signal to be written to the IC card 200.

If the IC card 200 has been inserted from the card insert opening 42 in the direction of the arrow F and is positioned in place (see FIG. 6), the IC card 200 can be removed from the IC card reader/writer only by sliding it in the opposite direction of the arrow F through the opening 50.

On the other hand, when the IC card 200 is inserted from the card insert opening 44 in the direction of an arrow E, the gate member 154 of the gate device 150 in the vicinity of the card insert opening 44 rotates toward the inside of the body 10 to allow the IC card 200 to be inserted into the inside of the body 10. The gate member 154 of the gate device 150 located in the vicinity of the card insert opening 42 defines the position of the end of the IC card 200.

As described above, according to the first embodiment, irrespective of whether the IC card 200 is inserted from the left side slot or the right side slot (the card insert opening 42 or 44), it is possible to position the IC card in place to read or write a signal from or to the IC card.

Figure 8:
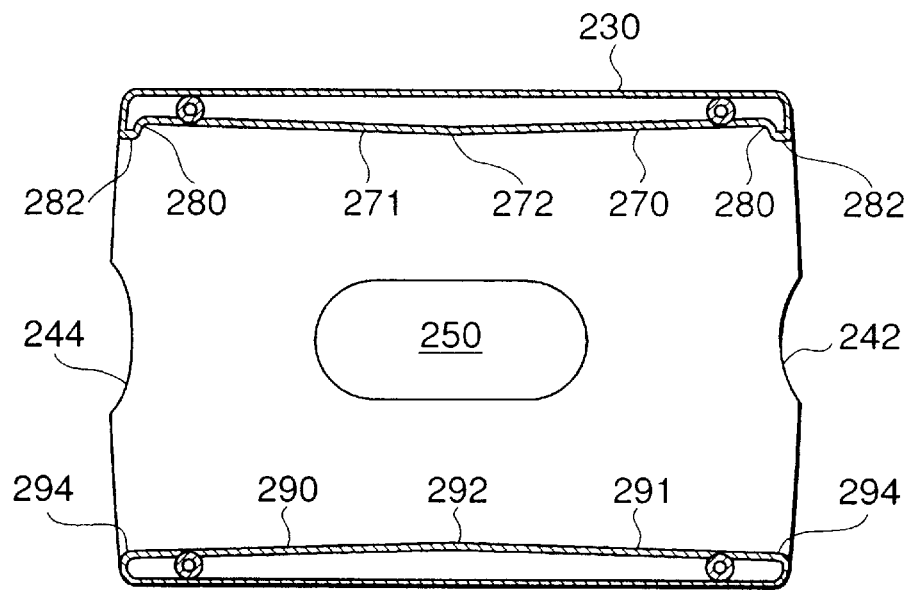
FIG. 8 is a schematic sectional view of a card reader/writer according to a second embodiment of the present invention.

An IC card reader/writer according to the second embodiment of the present invention will now be explained with reference to FIGS. 8 and 9. The exterior of the IC card reader/writer according to the second embodiment is almost the same as that of the first embodiment shown in FIGS. 1 and 2. The body 210 of the IC card reader/writer is constituted of an upper member 220 and a lower member 230. The body 210 has two IC connectors (not shown) and a circuit board (not shown) positioned in place therein. As shown in FIG. 8, guide walls 270, 290 are disposed along inner walls of the lower member 230 and are linked to card insert openings 282, 282. The guide wall 270 has a slightly inwardly bowed shape. In other words, the distance between the guide wall 270 and the inner wall of the lower member 230 is larger at the central portion 272 of the guide wall than at the both ends 270 thereof. In addition, ends of the guide wall 270 in the vicinity of the card insert openings 242, 244 are provided with stoppers 280, 280 for restricting the movement of the IC card.

The guide wall 290 has a slightly inwardly bowed shape. The distance between the side walls 282, 282 of the lower member 230 adjacent to the stoppers 280, 280 of the guide wall 270 and the side walls 294, 294 of the guide wall 290 facing the side walls 282, 282 is slightly larger than the width of the IC card 200. In this embodiment, these guide walls 270, 290 unite with the lower member 30. In addition, the central portion of the lower member 230 is provided with an opening 250.

Figure 9:
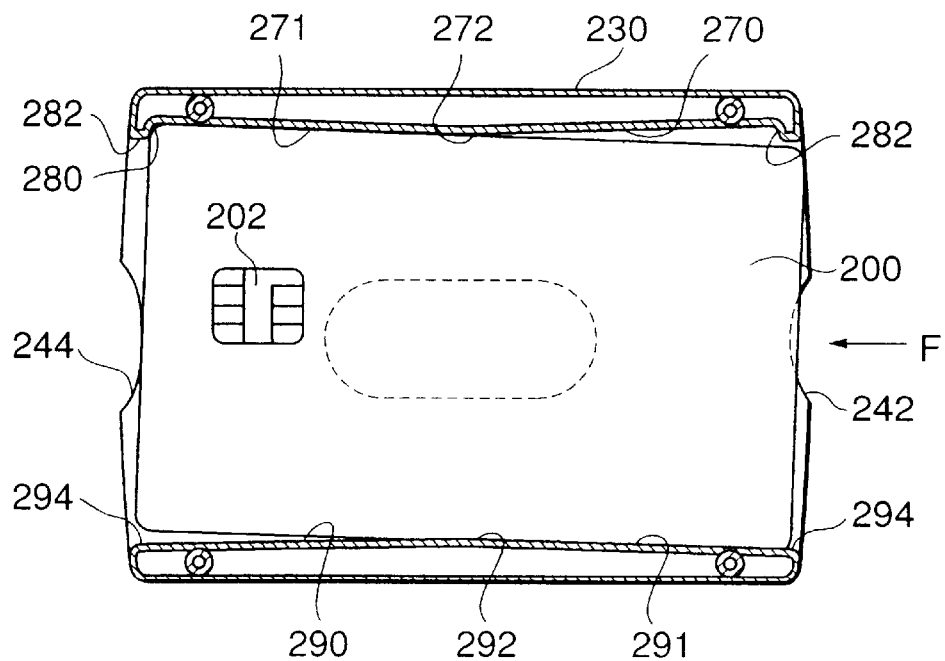
FIG. 9 shows an IC card inserted into the card reader/writer of FIG. 8.

In the thus constructed IC card reader/writer, when the IC card 200 is inserted from the card insert opening 242 in the direction of an arrow F as shown in FIG. 9, the IC card 200, after passing between the side wall 282 linked to the guide wall 270 and the side wall 294 of the guide wall 290, is first guided by an inclined surface 291 of the guide wall 290. Accordingly, the direction of IC card 200 advance is slightly inclined with respect to the arrow F (in FIG. 9, inclined upward). If the IC card 200 is further inserted, it is then also guided by an inclined surface 271 of the guide wall 270.

As shown in FIG. 9, when the IC card 200 has reached the vicinity of the other card insert opening 244, the end of the IC card 200 comes into contact with the stopper 280, whereby the IC card is inhibited from advancing in the direction of the arrow F so as to be positioned in place. In this position, the contacts 102 of the IC connector 100 are electrically connected to the contacts 202 of the connector located on the IC card 200. The user operates the switch keys 80, which causes a signal to be read from the IC card to the IC card reader/writer and predetermined information to be displayed on a screen of the display 90, or causes a predetermined signal to be written to the IC card 200.

As in the first embodiment, if the IC card 200 has been inserted from the card insert opening 242 in the direction of the arrow F and is positioned in place (see FIG. 9), the IC card 200 can be removed from the IC card reader/writer only by sliding it in the opposite direction of the arrow F through the opening 250.

When the IC card 200 is inserted from the card insert opening 244, the other stopper 280 (shown on the right side of FIG. 8) inhibits the IC card 200 from advancing so as to position the IC card 200 in place.

As described above, according to the second embodiment, an IC card reader/writer which enables the IC card 200 to be inserted from either the left or right side can be more simply constructed without movable components.

Figure 10:
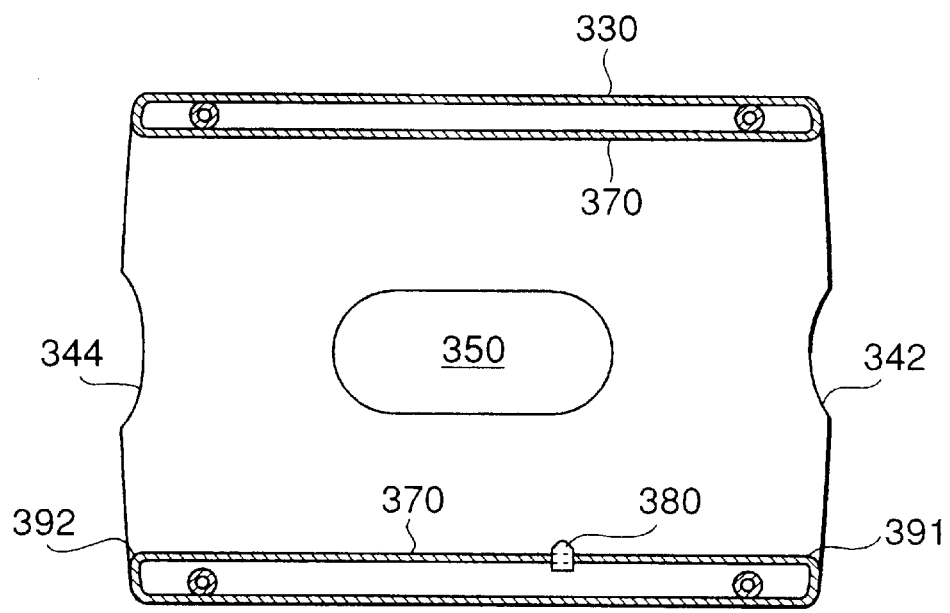
FIG. 10 is a schematic sectional view of a card reader/writer according to a third embodiment of the present invention.

An IC card reader/writer according to the third embodiment of the present invention will now be explained with reference to FIGS. 10 to 12. The exterior of the IC card reader/writer is almost the same as that of the first embodiment shown in FIGS. 1 and 2, and a body 310 of the IC card reader/writer is constituted of an upper member 320 and a lower member 330. The body 310 has two IC connectors (not shown) and a circuit board (not shown) positioned in place therein. As shown in FIG. 10, guide walls 370, 370 are located along inner walls of the lower member 330 and are linked to the lower member 330 at the ends thereof. The guide walls 370, 370 are parallel to the inner walls of the lower member 330 and unite with the lower member 330 in this embodiment. As shown in FIG. 10, one guide wall 370 is provided with a slider 380 slidable along the guide wall 370.

Figure 12:
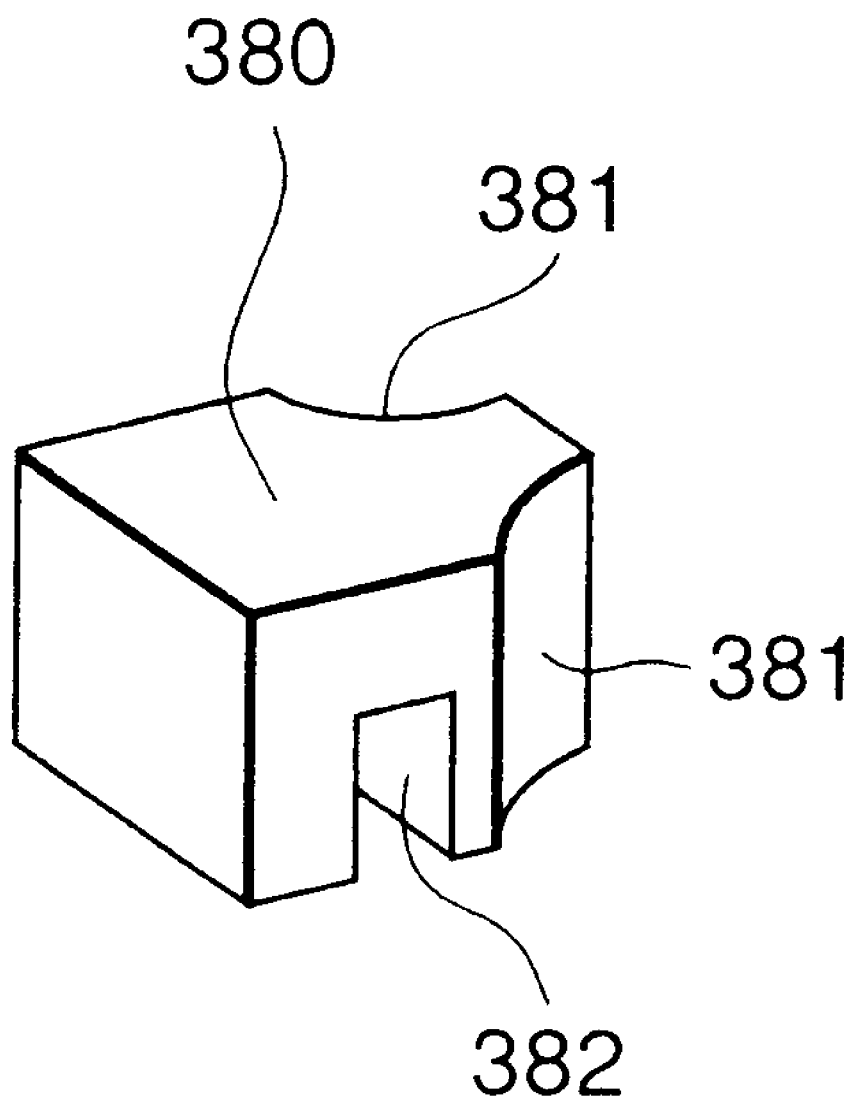
FIG. 12 is a detailed view of a slider according to the third embodiment.

As shown in FIG. 12, the slider 380 includes two side walls 381 for abutting against the end of the IC card 200 and a groove 382 of a size and shape matching the guide wall 370. The slider 380 straddles the guide wall 370 so that the groove 382 engages with the guide wall 370 to enable the slider 380 to slide along the guide wall 370. The upper member 320 keeps the slider 380 from being disengaged from the guide wall 370. Further, as can be seen from FIG. 10, the ends 391, 392 of the lower member 330 are linked to the guide wall 370. Accordingly, the slider 380 can slide only between the ends 391, 392.

Figure 11:
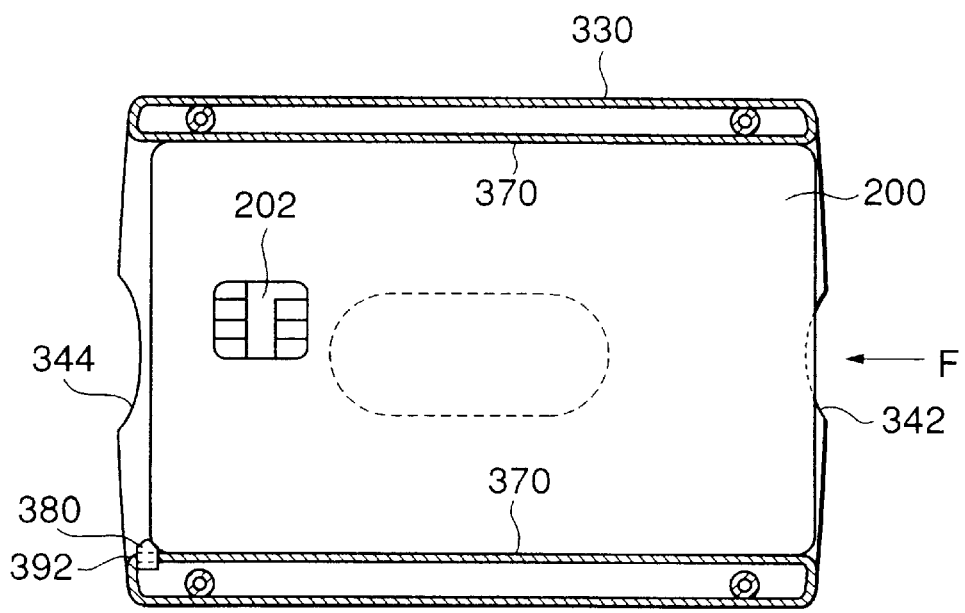
FIG. 11 shows an IC card inserted into the card reader/writer of FIG. 10.

In the thus constructed IC card reader/writer, when the IC card 200 is inserted from the card insert opening 342 in the direction of an arrow F as shown in FIG. 11, the end of the IC card 200 comes into contact with one side wall 381 of the slider 380. As the IC card is inserted, the slider 380 advances along the guide member 370 and the IC card 200 is guided by the guide member 370.

As shown in FIG. 11, when the slider 380 has reached the end 392 of the guide wall 370 at the card insert opening 344, it is inhibited from sliding farther, whereby the IC card is positioned in place. In this position, the contacts 102 of the IC connector 100 are electrically connected to the contacts 202 of the connector located on the IC card 200. The user operates the switch keys 80, which causes a signal to be read from the IC card to the IC card reader/writer and predetermined information to be displayed on a screen of the display 90, or causes a predetermined signal to be written to the IC card 200.

As in the first embodiment, if the IC card has been inserted from the card insert opening 342 in the direction of the arrow F and is positioned in place (see FIG. 11), the IC card 200 can be removed from the IC card reader/writer only by sliding it in the opposite direction of the arrow F through the opening 350.

When the IC card 200 is inserted from the card insert opening 344, the slider 380 advances toward the other end 391 of the guide wall 370. When the slider 380 has reached the end 391, it is inhibited from sliding farther, whereby the IC card is positioned in place. In this position, the other contacts 102 of the IC connector 100 are electrically connected to the contacts 202 of the connector located on the IC card 200.

According to the third embodiment, by providing the slider 380 slidable along the guide wall 370, it is possible to provide a more simply constructed IC card reader/writer which enables the IC card 200 to be inserted from either the left or right side.

The present invention thus enables the IC card to be inserted from opposite directions. Accordingly, either a right-handed or left-handed person can easily insert an IC card into the IC card reader/writer. Furthermore, since the foregoing can be accomplished merely by adding at most two IC connectors and a few mechanical components to the IC card reader/writer, it is possible to provide the IC card reader with little increase in cost.

The present invention has thus been shown and described with reference to specific embodiments. However, it should be noted that the present invention is in no way limited to the details of the described arrangements but changes and modifications may be made without departing from the scope of the appended claims.

For example, although in the above described embodiments, the lower member is provided with the guide wall to guide the inserted IC card, it is possible to provide the upper member with the guide wall.

Further, in the above described embodiments, the guide walls unite with the lower member, however, this invention is not limited to this, and the guide walls may be fitted into the lower member or fixed to the lower member by fastening devices such as screws.

Furthermore, although the above described embodiments are application of an IC card reader/writer which reads or writes signals (data) from or to an IC card, it is also possible to apply the present invention to an IC card reader which can only read data from the IC card or an IC card writer which can only write data to the IC card.

Moreover, in the present invention, the function of a single member may be accomplished by two or more physical members and the function of two or more members may be accomplished by a single physical member.

We claim:

1. An IC card reader/writer for reading a signal from an IC card and/or for writing a signal to the IC card, comprising:

a hollow body having first and second slots on opposite sides thereof;

a positioning member within the body which positions the IC card in one place when inserted from the first slot located on one side of said body, and positions the IC card in the other place when inserted from the second slot located on the other side of said body so as to make the IC card readable irrespective of insertion of the IC card in the first slot or in the second slot;

a first IC connector electrically connected to a connector on the IC card positioned in the one place; and a second IC connector electrically connected to the connector on the IC card positioned in the other place, wherein said positioning member includes a first gate device located in the vicinity of said first slot and a second gate device located in the vicinity of said second slot, said first gate device is adapted to enable the IC card inserted from said first slot to advance and inhibit the IC card inserted from said second slot from advancing, and said second gate device is adapted to enable the IC card inserted from said second slot to advance and inhibit the IC card inserted from said first slot from advancing;

each of said gate devices includes:

a rotation member which rotates around one end of said opening and is restricted in rotation to be prevented from protruding outward from said opening; and an urging member which urges said rotation member to obstruct said opening, said rotation member rotating against said urging member when the IC card to be enabled to advance comes into contact therewith, thereby enabling the IC card to advance, and said rotation member continuing to obstruct the other of said slots by an action of said urging member when the IC card to be inhibited from advancing is inserted from one of said slots, thereby inhibiting the IC card form advancing.

2. An IC card reader/writer for reading a signal from an IC card and/or for writing a signal to the IC card, comprising:

a hollow body having first and second slots on opposite sides thereof;

a positioning member within the body which positions the IC card in one place when inserted from the first slot located on one side of said body, and positions the IC card in the other place when inserted from the second slot located on the other side of said body so as to make the IC card readable irrespective of insertion of the IC card in the first slot or in the second slot;

a first IC connector electrically connected to a connector on the IC card positioned in the one place; and a second IC connector electrically connected to the connector on the IC card positioned in the other place, further comprising:

two guide walls each extending from said first slot to said second slot and bowed toward each other;

one guide wall including a first inclined surface guiding the IC card inserted from said first slot and a second inclined surface guiding the IC card inserted from said second slot, the other guide wall including at third inclined surface facing said first inclined surface and a fourth inclined surface facing said second inclined surface, and said positioning member including:

a first stopper located at an end of said third inclined surface of said other guide wall adjacent to one of said openings and slightly protruded toward said one guide wall, said first stopper inhibiting the IC card inserted from said second slot from advancing; and a second stopper located an end of said fourth inclined surface of said other guide wall adjacent to the other of said openings and slightly protruded toward said one guide wall, said second stopper inhibiting the IC card inserted from said first slot from advancing.

3. An IC card reader/writer in accordance with claim 2, wherein, said third inclined surface guides the IC card inserted from said second slot and said forth inclined surface guides the IC card inserted from said first slot.

* * * * *